April 13, 1937.      B. F. CONNER      2,076,549
JAR
Filed April 24, 1935      2 Sheets-Sheet 1

Inventor
Benjamin F. Conner
By S. Jay Teller
Attorney

April 13, 1937.     B. F. CONNER     2,076,549
JAR
Filed April 24, 1935     2 Sheets-Sheet 2

Inventor
Benjamin F. Conner
By S. Jay Teller
Attorney

Patented Apr. 13, 1937

2,076,549

UNITED STATES PATENT OFFICE 2,076,549

JAR

Benjamin F. Conner, West Hartford, Conn., assignor to Colt's Patent Fire Arms Manufacturing Co., Hartford, Conn., a corporation of Connecticut Application April 24, 1935, Serial No. 18,031

17 Claims. (Cl. 215—6)

The invention relates particularly to jars adapted or intended primarily for containing cosmetic preparations, including salves, cold creams and other preparations of a pastelike consistency and also including powders. A jar embodying the invention may, if desired, be also used for containing in its lower portion a second and different preparation.

Jars for preparations of the general character referred to have heretofore been commonly made of glass, and certain standard shapes and sizes have been adopted and largely used in the trade. For some classes of uses it is required that a jar for this purpose molded from a material other than glass shall have the same effective capacity and the same external dimensions as a conventional glass jar, in order that existing trade practices may be maintained and in order that existing cartons, labels and the like may be used. Jars of this class are ordinarily flat at the top and have a total height which is less than the diameter.

One object of the present invention is to provide a jar which can be reliably and economically molded from materials of the synthetic resin class, and which can be used as a substitute for the conventional glass jar. It is very difficult to satisfactorily mold a synthetic resin one-piece jar having the same capacity and the same external dimensions as a conventional glass jar. The walls of a glass jar are very thick and when it is attempted to mold a similar jar from synthetic resin it is difficult, if not in fact impossible, to properly cure the very thick walls that are involved; and furthermore an excessive amount of expensive material is required. In accordance with the present invention I provide a two-part jar having separate inner and outer members which respectively provide the inner contour of the jar and at least a part of the outer contour thereof. By providing two separate members I avoid the before-mentioned difficulties incident to the molding of very thick walls, and at the same time I obtain various other important advantages as will presently appear.

Another object of the invention is to provide a jar of the class described wherein the component members are so formed and related that two different preparations can be contained in the respective inner and outer members, the construction being such that access can be conveniently had to the interior of either member to permit the preparation therein to be conveniently used.

Still another object of the invention is to provide a jar of the class described wherein the inner and outer members thereof are or may be of different colors, thus obtaining important advantages which will be more specifically pointed out hereinafter. When the two members are of different colors, the inner member may advantageously be provided with a circumferential rib which is exposed to provide a color contrast with the outer member and with the cap and which may also serve as a means for indicating the character of the contents of the jar.

Still other objects of the invention will be apparent from the following specification, wherein various additional advantages of the invention are pointed out.

This present application constitutes a continuation-in-part of my copending application for Jars, Serial No. 668,581 filed April 29, 1933.

In the accompanying drawings I have shown several alternative embodiments of the invention in order that the scope thereof may be clearly indicated, but it will be understood that the drawings are intended for illustrative purposes only and are not to be construed as defining or limiting the scope of the invention, the claims forming a part of this specification being relied upon for that purpose.

Figure 1:
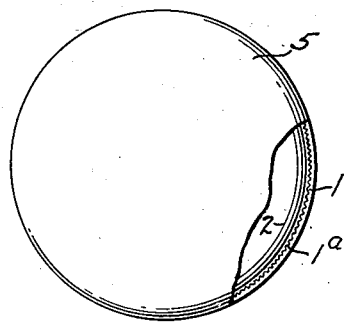
Fig. 1 is a plan view of a jar embodying the invention, a portion of the closure being broken away.
Figure 2:
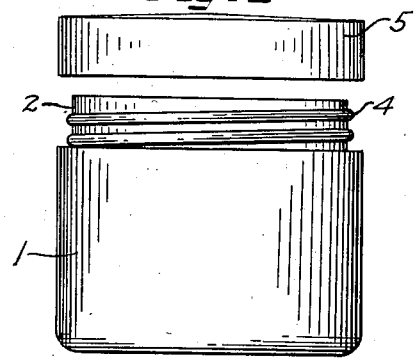
Fig. 2 is a side view showing the closure separated from the jar proper.
Figure 3:
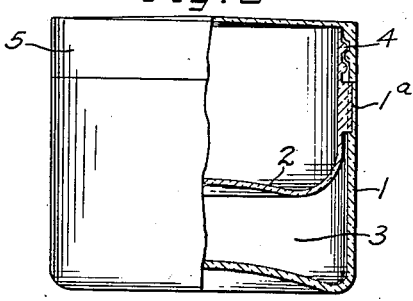
Fig. 3 is a combined elevational and vertical sectional view of the jar and closure.

Referring to Figs. 1, 2, and 3 of the drawings, 1 and 2 represent respectively the two concentric members constituting the body of the jar. The two members 1 and 2 are herein designated respectively as outer and inner members, but they may also be regarded as base and containing members respectively, inasmuch as the member 1 serves as a support or base for the member 2 which serves as the primary container. When the jar is intended as a substitute for the conventional or standard glass jar, the exterior contour of the member 1 may conform to the exterior contour of a conventional glass jar; and the member 2 preferably has an interior capacity corresponding to that of a conventional glass jar, although its shape may be different if desired. The inner member 2 is preferably so formed that its interior dimensions are at least as great at the top as they are below the top. The outer member 1 surrounds at least the lower portion of the inner member 2, and circumferential or peripheral portions of the two members are in engagement with each other at a zone immediately below the top of the outer member.

It will be understood that the members 1 and 2 may be molded from materials of the synthetic resin class, although the invention is not necessarily so limited. For instance, the outer member 1 may be formed of metal to provide ornamental effects or colors which cannot be conveniently or economically obtained with molded material. Each of the members 1 and 2 is ordinarily formed or molded as a single unitary piece, but as to the outer member 1 I do not necessarily so limit myself. The members 1 and 2, when formed of molded material, are molded separately, and it will be evident that their walls are relatively thin so that they can be conveniently molded and effectively cured. These relatively thin walls not only make possible effective curing, but they also bring about a considerable economy of material as will be evident by observing the space 3 between the two members below and surrounding the member 2. While it is ordinarily preferable to provide an interior capacity corresponding to that of a standard glass jar, it is obviously possible to considerably increase the interior capacity without changing the exterior dimensions.

The inner member 2 is extended upward above the top of the outer member 1 and is adapted to receive or engage a closure of the cap type. Preferably it is provided with external threads 4 of conventional form. A closure or cap 5 of conventional form is provided, this cap engaging the threads 4 on the member 2. The cap is substantially flat at the top, although it may be slightly crowned, as shown in the drawings. As shown, the exterior diameters of the member 1 and of the cap 5 are the same, but as to this there may be variation.

The two members 1 and 2 may be cemented together, if desired, to prevent relative rotative movement; but I preferably provide the two members 1 and 2 with interlocking means for preventing such movement. The construction of the interlocking means is preferably such that the inner and outer members can be easily and quickly assembled in any of several different positions of relative angular adjustment. The construction is such that, in assembling, the inner member is moved downward relatively to the outer member. As shown in Figs. 1 and 3, at least one of the two members is provided with a complete circumferential series of serrations or notches, and as shown both members are provided at 1a with such serrations in engagement in each other. It will be observed that the exterior vertical serrations on the member 2 and the interior vertical serrations on the member 1 engage with each other in such a way that relative rotation is prevented. Irrespective of the initial angular relation between the two members, they can be easily and quickly engaged without much, if any, relative rotation. It will be evident that, after assembly, the outer member 1 can be grasped in one hand and that the cap 5 can be screwed into or out of place with the other hand without there being any possibility of relative rotation of the member 2.

It will be evident that a jar embodying my invention can be filled, packed, sold and used in exactly the same manner as is now the case with glass jars. However, it has numerous advantages that are not to be found in glass jars, or in one-piece synthetic resin jars. There are no incompletely or improperly cured interior portions such as have existed with one-piece molded jars; and by reason of the two-part construction it is considerably lighter than a glass jar, thus reducing shipping weight and providing increased convenience in use.

The air space at 3 between the two members serves to protect the contents of the jar from excessive temperature changes. The two-piece construction further makes it possible for the inner member 2 to be formed of such material as is best adapted to resist the action of the particular preparation to be contained in it, while permitting the outer member 1 to be formed of a different and, if desired, cheaper material; and if there should be any deterioration of the inner member 2, by reason of absorption of any portion of the contents or otherwise, such deterioration will not in any way affect the exterior appearance of the outer member.

It will be further observed that, if in packing or in shipping, the outer member 1 becomes marred or damaged in such a way as to make the jar unsaleable, the damage can be inexpensively repaired by substituting a new outer member without loss of the inner member 2 or of the contents. It will also be apparent that if the jar should be accidentally dropped during use, the breakage, if any, would ordinarily be confined to the outer member 1, thus avoiding loss or deterioration of the contents. The inner member 2 with the cap 5 constitute, in and of themselves an entirely satisfactory container.

In accordance with the invention it is possible to provide different exterior designs at a minimum expense, as it will be apparent that different molds can be provided for different designs for the outer member 1 without changing the molds required for the inner member 2.

The space 3 between the two containers, particularly when of considerable depth as shown, may be used as a supplemental container. When the jar is to be so used the two members are readily separable, the engagement between them being a frictional one, permitting the members to be separated by relative vertical movement. A face cream or other cosmetic may be contained in the inner member 2 and a powder and, if desired, a powder puff may be contained in the space 3 within the outer member 1. It will be obvious that after using the cream in the inner member 2 the said inner member may be withdrawn from the outer member, thus making the powder puff and powder in the outer member conveniently available. It will also be apparent that, as an alternative, the two members 2 and 1 may be used to contain two different types of cream intended to be used alternately or successively.

The provision of the two separate parts 1 and 2 makes it possible to provide color combinations which add greatly to the attractiveness of the package, particularly when the cap is removed. The inner member 2 may advantageously have the same color as the cream or other contents of the jar, while the outer member 1 may have any color dictated by artistic requirements. It has been found that certain creams are somewhat translucent and that when placed in a container having a color different from the color of the cream itself there is an appearance of discoloration or deterioration adjacent the edges of the container where the cream appears to partake of the color of the container. This may be entirely avoided in a jar embodying my invention, as the inner member can have exactly the same color as the cream.

Figure 4:
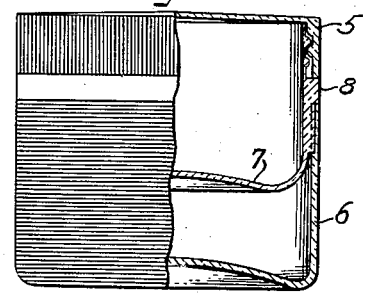
Fig. 4 is a view similar to Fig. 3 but showing an alternative embodiment of the invention.

In Fig. 4 I have shown an alternative embodiment of the invention which may be preferable in some cases. As shown, the outer member 6 is somewhat lower than the member 1 appearing in Fig. 3, and the inner member 7 is enlarged at 8 to provide an annular exteriorly exposed rib adapted to be superposed upon the member 6. The construction may otherwise be similar to what is shown in Figs. 1 to 3.

While I have shown the enlarged portion or rib 8 as being of the same diameter as the outer member 6 and as fitting the said member at a horizontal plane, it will be understood that there may be variations as to relative diameters and as to the manner of engagement in accordance with the particular ornamental design which may be found desirable. The rib 8 may be narrow as shown, and may have a height less than that of the cap 5.

When the form shown in Fig. 4 is used, the exposed portion or rib 8 of the inner member may serve as an indication of the color, and therefore, of the character, of the cream contained in the jar. The exterior of the jar may, if desired, have three different colors, the member 6 having one color, the rib 8 having a second color and the cap 5 having a third color. In Fig. 4 these colors are indicated as being blue, white and red respectively.

In Figs. 5 to 9 I have shown another alternative construction which is in some respects similar to that shown in Fig. 4. The outer member 9 is similar to the outer member 6 shown in Fig. 4, but the inner member 10 differs from the member 7 in that it is deeper and of smaller diameter. The side walls of the inner member 10 are spaced inward from the side walls of the outer member 9 so as to provide an annular space 11 of considerable width, thus more fully insulating the inner member and its contents from the outer member. For closing or bridging the annular space 11 at the top thereof there is provided an annular flange immediately below the level of the threaded portion of the inner member. This flange may be carried by either member, but as shown it is carried by and formed integrally with the inner member, being designated by 12. The flange 12 is of the same diameter as the outer member 9 and rests on top of it.

The inner member is closed at the top by a threaded closure or cap 13. The bottom edge of the cap is closely adjacent the top surface of the flange 12 and on account of the smaller diameter of the inner member 10 the outer diameter is somewhat less than that of the flange, thus providing an inward offset. The cap 13 may be provided with a liner or gasket 14 which fits against the top of the inner member to seal it.

Figure 5:
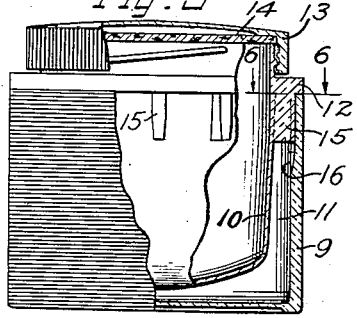
Fig. 5 is a combined elevational and vertical sectional view of an alternative jar and cover embodying the invention.
Figure 6:
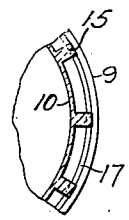
Fig. 6 is a fragmentary horizontal sectional view taken along the line 6—6 of Fig. 5.

The inner and outer members engage or are connected with each other so as to resist relative vertical movement, and the said members are provided with suitable interengaging or interlocking means for preventing relative rotation between the said members particularly when the cap 13 is put in place or removed. As shown in Figs. 5 to 9, this interlocking means consists of a plurality of lugs on one of the members and corresponding notches on the other member for receiving the lugs. As shown, the inner member 10 is provided with a plurality of radially outward extending lugs 15, 15 and the outer member 9 is provided with a corresponding plurality of notches 16, 16. Preferably, as shown in Fig. 5, the lugs 15 are slightly tapered at their lower ends to facilitate their entry into the notches 16.

Figure 7:
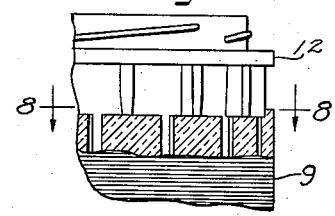
Fig. 7 is a fragmentary vertical sectional view showing a preliminary relationship between the inner and outer members during assembly. In this view a portion of the outer member is broken away and shown in section along the line 7—7 of Fig. 8.
Figure 9:
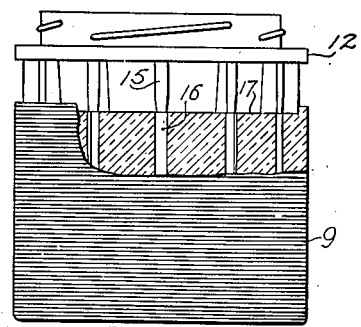
Fig. 9 is a view showing the parts in a relationship similar to that shown in Fig. 7 but with the members relatively rotated to bring the lugs and grooves into register with each other.
Figure 8:
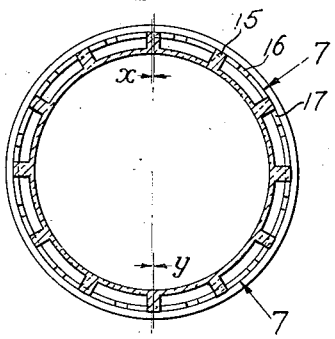
Fig. 8 is a horizontal sectional view taken along the line 8—8 of Fig. 7.

To further facilitate assembly, the outer member 9 is provided with an annular rabbet 17 adjacent the upper ends of the notches 16, this rabbet being of such diameter as to receive the lower ends of the lugs 15 in the event that they do not initially register with the notches 16. Figs. 7 and 8 show the two members in a preliminary relationship with the lugs and notches out of register. The construction illustrated facilitates assembly as the operative can quickly place the parts in the relationship shown in Figs. 7 and 8 without giving any attention to the alignment of the lugs with the notches. With the lower ends of the lugs entered in the rabbet 17 the two members can be relatively turned until the lugs come into register with the notches, as shown in Fig. 9. Then the inner member can be pressed relatively downward until the members are completely assembled.

With a construction such as shown in Figs. 5 to 9, it may be desired to prevent, so far as possible, any disengagement or separation of the two members by the user.

In order to provide increased friction for resisting disengagement or relative vertical movement of the members it may be desirable to slightly vary the relative spacing of the lugs and notches. Referring particularly to Fig. 8, it may be assumed that the several notches 16 are uniformly spaced circumferentially of the outer member. As to the lugs, however, there is a slight variation in spacing. As illustrated, the lug at the top is spaced slightly toward the left, and the lug at the bottom is spaced slightly toward the right, the amounts of offset being indicated at $x$ and $y$. It will be understood that these amounts are exaggerated in the drawings, actually being only a few thousandths of an inch. The variation in spacing may be confined to two lugs, as shown, but it is ordinarily preferred to vary the spacing of more than two lugs. As the result of the slight difference in spacing of some of the lugs with respect to the notches, the members must be forced into engagement and slightly distorted. This provides additional friction which resists disengagement.

Figure 10:
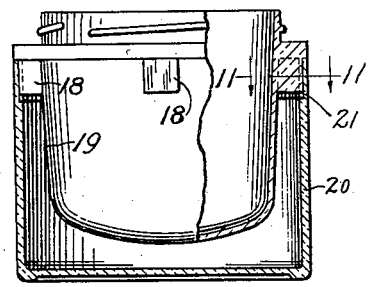
Fig. 10 is a vertical sectional view showing another alternative embodiment of the invention.
Figure 11:
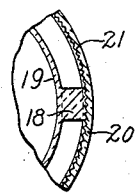
Fig. 11 is a fragmentary horizontal sectional view taken along the line 11—11 of Fig. 10.

In Figs. 10 and 11 I have shown a construction which is in many respects similar to that shown in Figs. 5 to 9. However, instead of providing a large number of small lugs such as 15 there are provided four wider lugs 18, 18. These lugs 18 are formed on the inner member 19 and are serrated at their ends. The outer member 20 is provided at 21 with a continuous annular series of vertical serrations. The continuous annular series of serrations on the member 20 makes it possible for the member 19 to be assembled therewith in practically any relative position without the necessity for much, if any, preliminary angular adjustment.

Figure 12:
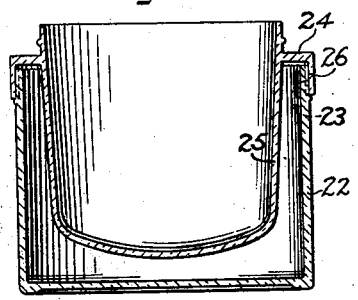
Fig. 12 is a vertical sectional view showing another alternative embodiment of the invention.

In the construction shown in Fig. 12 the outer member 22 is provided with an external series of vertical serrations 23 and the flange 24 on the inner member 25 is provided with a depending wall 26 having internal serrations adapted to engage the serrations 23 on the outer member.

Figure 13:
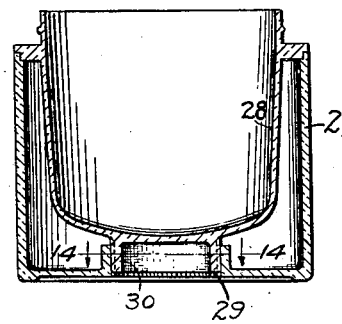
Fig. 13 is a vertical sectional view showing another alternative embodiment of the invention.
Figure 14:
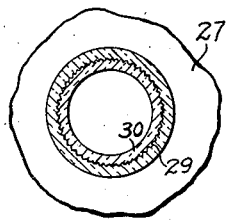
Fig. 14 is a fragmentary horizontal sectional view taken along the line 14—14 of Fig. 13.

In the construction shown in Figs. 13 and 14 the interlocking connection between the outer and inner members 27 and 28 is near the bottom instead of being near the top. The outer member 27 is provided at the bottom with a central circular aperture, the walls of which are provided with internal vertical serrations at 29. Formed on the bottom of the inner member 28 is a depending boss 30 which is adapted to enter the aperture in the outer member, this boss being provided with vertical serrations adapted to engage the vertical serrations 29 on the outer member. In this way relative rotation between the two members is prevented, and by providing a relatively tight fit between the parts the friction resists disengagement.

Figure 15:
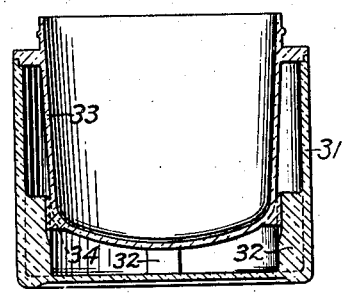
Fig. 15 is a vertical sectional view showing another alternative embodiment of the invention.

The construction shown in Fig. 15 is similar to that shown in Figs. 13 and 14. The outer member 31, instead of being provided with an aperture having a continuous series of serrations therein, is provided with radially inward extending lugs 32, 32 having serrations thereon. The inner member 33 is provided with a continuous annular series of serrations at 34, which serrations are adapted to engage the serrations on the lugs 32.

Figure 16:
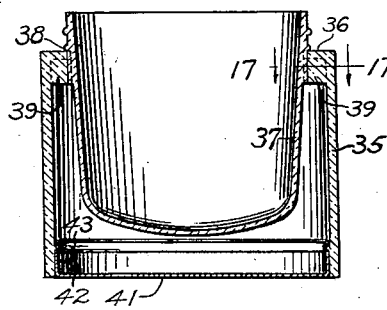
Fig. 16 is a vertical sectional view showing another alternative embodiment of the invention.
Figure 17:
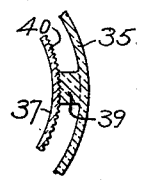
Fig. 17 is a fragmentary horizontal sectional view taken along the line 17—17 of Fig. 16.

In Figs. 16 and 17 I have shown a construction with differs from any of those thus far shown and described in that the horizontal flange for bridging the annular space between the inner and outer members is carried by the outer member instead of by the inner member. The outer member 35 has a radially inward extending flange 36 which engages the inner member 37. The said inner member may be provided with a small annular bead 38 which rests on the flange 36. The outer member 35 is also provided with radially inwardly extending lugs 39, 39 which are serrated and which engage an annular series of serrations on the inner member at 40.

When the outer member is formed with a radially inwardly extending flange such as 36 or with radially inwardly extending lugs such as 39 or with both, it is difficult, if not impossible, to mold it with an integral bottom wall. The bottom of the member 35 may be left entirely open, or if desired, there may be provided a sheet metal bottom member 41. As shown, the member 41 is flanged at 42 and has a circumferential groove at 43 adapted to receive a small circumferential bead on the member 35. The groove and the bead are very shallow to permit the sheet metal bottom member to be readily snapped into place.

Figure 18:
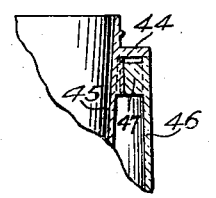
Fig. 18 is a fragmentary vertical sectional view showing another alternative embodiment of the invention.

In Fig. 18 I have shown a construction very similar to that shown in Figs. 16 and 17. The annular horizontal flange 44, instead of being formed on the outer member, is formed on the inner member 45. The outer member 46 has lugs 47, 47 thereon similar in construction and function to the lugs 39, 39 already described.

Figure 19:
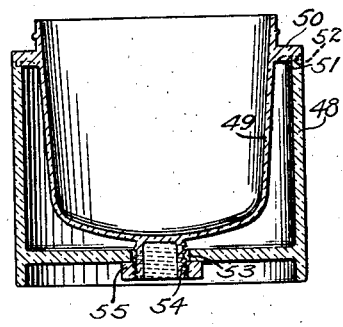
Fig. 19 is a vertical sectional view showing another alternative embodiment of the invention.

In Fig. 19 I have shown a construction which differs from any of those thus far shown and described in that the two members are positively locked so as to prevent relative vertical movement. The construction is in some respects similar to what is shown in Figs. 13 and 14, there being an outer member 48 and an inner member 49. The inner member 49 has a flange 50 which rests upon the top of the outer member 48 and preferably the bottom of the flange 50 is provided with serrations at 51 which register with corresponding serrations at 52 in a rabbet formed in the top portion of the outer member 48.

The bottom wall of the member 48 is formed with an opening at 53 and a threaded projection 54 is formed on the bottom of the inner member 49, this threaded projection extending through the opening 53. A nut 55 is provided which engages the threads on the projection 54 and also engages the bottom of the bottom wall of the member 48. The two members 48 and 49 are first assembled in the relationship shown and then the nut 55 is put in place, thus positively holding the two members together.

It will be observed that the interengaging serrations at 51 and 52 positively prevent any relative rotation between the inner and outer members.

Figure 20:
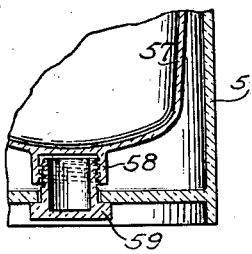
Fig. 20 is a fragmentary vertical sectional view showing another alternative embodiment of the invention.

The construction shown in Fig. 20 is similar to that shown in Fig. 19 and the outer and inner members 56 and 57 are similar to the outer and inner members 48 and 49 shown in Fig. 19. The inner member has a downward extending projection 58 which is hollow and which is internally threaded. A plug 59 is provided which enters the central opening in the bottom wall of the member 56 and is externally threaded to engage the internal thread in the projection 58.

What I claim is:

1. The combination in a jar of the class described, of an inner thin-walled cup-shaped member molded from a material of the synthetic resin class and externally threaded adjacent its upper periphery, the said inner member having its interior diameter at the top at least as large as is the interior diameter below the top, an outer thin-walled member molded from a material of the synthetic resin class and surrounding the lower portion of the inner member, the said outer member having a portion in engagement with a peripheral portion of the inner member and being adapted to permit the said inner member to be moved vertically downward into assembled relationship with the outer member, means formed integrally with the inner and outer members and having interengaging substantially vertical walls serving to prevent relative rotation, and a closure of the cap type interiorly threaded to engage the thread on the inner member.

2. The combination in a jar of the class described, of an inner thin-walled cup-shaped member molded from a material of the synthetic resin class and externally threaded adjacent its upper periphery, the said inner member having its interior diameter at the top at least as large as is the interior diameter below the top, an outer thin-walled member molded from a material of the synthetic resin class and surrounding the lower portion of the inner member, the said outer member having a substantially cylindrical vertical circumferential portion in engagement with a substantially vertical portion of the inner member and being adapted to permit the inner member to be moved vertically downward into assembled relationship with the outer member, means interengaging between the inner and outer members to prevent relative rotation, and a closure of the cap type interiorly threaded to engage the thread on the inner member.

3. The combination in a jar of the class described, of an inner thin-walled cup-shaped member externally threaded adjacent its upper periphery and having its interior diameter at the top at least as large as is the interior diameter below the top, an outer thin-walled member surrounding the lower portion of the inner member and having a substantially cylindrical vertical circumferential portion in engagement with a substantially vertical portion of the inner member and adapted to permit the inner member to be moved vertically downward into assembled relationship with the outer member, means on the inner and outer members adapted to permit engagement between them in any one of several angularly different relationships and serving after engagement to prevent relative rotation, and a closure of the cap type interiorly threaded to engage the threads on the inner member.

4. The combination in a jar of the class described, of inner and outer thin-walled concentric members one of which has a continuous series of substantially vertical serrations thereon and the other of which has means for engaging the serrations to prevent relative rotation between the members, the said inner member being cup-shaped and being externally threaded adjacent its upper periphery and having its interior diameter at the top at least as large as is the interior diameter below the top and the said outer member surrounding the major portion of the inner member and having its top edge near the externally threaded portion thereof, and a closure of the cap type interiorly threaded to engage the threaded portion of the inner member.

5. In a jar of the class described, the combination of an inner thin-walled cup-shaped member externally threaded adjacent its upper periphery and having its interior diameter at the top at least as large as is the interior diameter below the top, an outer thin-walled substantially cylindrical member surrounding the lower portion of the inner member and having a substantially vertical circumferential portion in engagement with a substantially vertical portion of the inner member, and a closure of the cap type interiorly threaded to engage the threads on the inner member, the said closure when in place extending into close proximity with the outer member so as to substantially conceal the inner member.

6. A jar comprising in combination, an inner thin-walled cup-shaped member adapted at its upper periphery for engagement with a closure and having its interior diameter at the top at least as large as is the interior diameter below the top, the said inner member being provided immediately below the closure engaging portion with a peripherally exposed narrow rib having an upward facing top surface, an outer thin-walled member surrounding the lower portion of the inner member immediately below the said rib and having a circumferential portion in engagement with a circumferential portion of the inner member, the said outer member engaging the inner member to resist relative vertical movement, and a closure of the cap type fitting the inner member and having its lower edge immediately adjacent the top surface of the rib.

7. A jar comprising in combination, an inner thin-walled cup-shaped member adapted at its upper periphery for engagement with a closure and having its interior diameter at the top at least as large as is the interior diameter below the top, the said inner member being provided immediately below the closure engaging portion with a peripherally exposed narrow rib having an upward facing top surface, an outer thin-walled substantially cylindrical member surrounding the lower portion of the inner member immediately below the said rib and having substantially the same diameter as the rib, the said outer member having a substantially vertical circumferential portion in engagement with a substantially vertical portion of the inner member, and a closure of the cap type fitting the inner member and having its lower edge immediately adjacent the top surface of the rib.

8. A jar of the class described having a total height less than its diameter, which jar comprises in combination, an inner thin-walled member molded from a material of the synthetic resin class and provided at its upper periphery with external threads and provided below the threads with an annular exteriorly exposed rib, an outer thin-walled member molded from a material of the synthetic resin class and surrounding the lower portion of the inner member and circumferentially engaging the said inner member immediately below the said rib, and a closure of the cap type substantially flat at the top and interiorly threaded to engage the exterior thread on the inner member, the lower edge of the closure being immediately adjacent the top surface of the rib.

9. A jar comprising in combination, an inner thin-walled member provided at its upper periphery with external threads adapted to be engaged by the internal threads of a closure of the cap type and provided below the threads with an annular exteriorly exposed rib, and an outer thin-walled member surrounding the lower portion of the inner member and circumferentially engaging it immediately below the said rib, the said inner and outer members having integral interlocking means below the annular rib for preventing relative rotation.

10. The combination in a jar of the class described, of an inner thin-walled cup-shaped member externally threaded adjacent its upper periphery, an outer thin-walled member surrounding the lower portion of the inner member and spaced outward therefrom, one of the said thin-walled members having an integral flange surrounding the inner member immediately below the level of the threaded portion thereof which flange extends horizontally to bridge the space between the two members, and a closure of the cap type interiorly threaded to engage the thread on the inner member and having its bottom closely adjacent the said annular flange.

11. The combination in a jar of the class described, of an inner thin-walled cup-shaped member molded from a material of the synthetic resin class and externally threaded adjacent its upper periphery, an outer thin-walled member molded from a material of the synthetic resin class and surrounding the lower portion of the inner member and spaced outward therefrom, the said thin-walled members being provided with integral interengaging means for preventing relative rotation and one of the said members having an integral flange surrounding the inner member immediately below the level of the threaded portion thereof which flange extends horizontally to bridge the space between the two members, and a closure of the cap type interiorly threaded to engage the thread on the inner member and having its bottom closely adjacent the said flange.

12. The combination in a jar of the class described, of an outer thin-walled substantially cylindrical member, an inner thin-walled cup-shaped member externally threaded adjacent its upper periphery and having its lower portion surrounded by the outer member and spaced inward therefrom which inner member is removable vertically upward from the outer member, one of the said thin-walled members having an annular flange immediately below the level of the threaded portion of the inner member which flange extends horizontally to bridge the annular space between the two members, and a closure of the cap type interiorly threaded to engage the thread on the inner member and having its bottom closely adjacent the said annular flange.

13. The combination in a jar of the class described, of an inner thin-walled cup-shaped member externally threaded adjacent its upper periphery, an outer thin-walled substantially cylindrical member surrounding the lower portion of the inner member and spaced outward therefrom, one of the said thin-walled members having a plurality of lugs which engage the other member to prevent relative rotation and one of the said members having an annular flange immediately below the level of the threaded portion of the inner member which flange extends horizontally to bridge the annular space between the two members, and a closure of the cap type interiorly threaded to engage the thread on the inner member and having its bottom closely adjacent the said annular flange.

14. The combination in a jar of the class described, of an inner thin-walled cup-shaped member externally threaded adjacent its upper periphery, an outer thin-walled substantially cylindrical member surrounding the lower portion of the inner member and spaced outward therefrom, one of the said thin-walled members having a plurality of radially extending lugs which engage the other member to prevent relative rotation and the same member also having an annular flange immediately below the level of the threaded portion of the inner member which flange extends horizontally to bridge the annular space between the two members, and a closure of the cap type interiorly threaded to engage the thread on the inner member and having its bottom closely adjacent the said annular flange.

15. The combination in a jar of the class described, of an outer thin-walled member molded from a material of the synthetic resin class, an inner thin-walled cup-shaped member molded from a material of the synthetic resin class and externally threaded adjacent its upper periphery, the said inner member having its lower portion surrounded by the outer member and spaced inward therefrom and the said inner member having a plurality of lugs which engage the outer member to prevent relative rotation and also having an annular flange immediately below the level of the threaded portion and extending outward to bridge the annular space between the two members, and a closure of the cap type interiorly threaded to engage the thread on the inner member and having its bottom closely adjacent the said annular flange.

16. In a jar of the class described, the combination of an inner thin-walled cup-shaped member externally threaded adjacent its upper periphery, and an outer thin-walled member surrounding the lower portion of the inner member and spaced outward therefrom, one of the said thin-walled members having a plurality of notches and the other of the said thin-walled members having a corresponding plurality of lugs which enter the notches and are spaced slightly differently therefrom to provide increased friction for resisting disengagement, and an integral annular flange on one of the members immediately below the level of the threaded portion of the inner member which flange extends horizontally to bridge the space between the two members.

17. In a jar, the combination of an inner thin-walled cup-shaped member externally threaded adjacent its upper periphery, and an outer thin-walled substantially cylindrical member surrounding the lower portion of the inner member and spaced outward therefrom, one of the said thin-walled members having a plurality of notches and an annular rabbet adjacent the entrance ends of the notches and the other of the said thin-walled members having a corresponding plurality of radially extending lugs adapted to enter the rabbet and then by relative rotation to enter the notches, and an integral annular flange on one of the members immediately below the level of the threaded portion of the inner member which flange extends horizontally to bridge the annular space between the two members.

BENJAMIN F. CONNER.